United States Patent
Abe

(10) Patent No.: US 6,850,653 B2
(45) Date of Patent: Feb. 1, 2005

(54) IMAGE READING SYSTEM, IMAGE READING SETTING DETERMINATION APPARATUS, READING SETTING DETERMINATION METHOD, RECORDING MEDIUM, AND PROGRAM

(75) Inventor: Koichi Abe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 537 days.

(21) Appl. No.: 09/924,143

(22) Filed: Aug. 7, 2001

(65) Prior Publication Data

US 2002/0067515 A1 Jun. 6, 2002

(30) Foreign Application Priority Data

Aug. 8, 2000 (JP) ........................................ 2000-240162

(51) Int. Cl.$^7$ .............................. G06K 9/20; H04N 1/04
(52) U.S. Cl. ......................... 382/312; 382/305; 358/474
(58) Field of Search ................................ 382/312, 313, 382/305, 318, 298; 345/418; 358/528, 449, 451, 474, 296; 711/1, 100; 271/9.06

(56) References Cited

U.S. PATENT DOCUMENTS

| | | | | |
|---|---|---|---|---|
| 4,887,165 A | * | 12/1989 | Sato et al. | 358/474 |
| 5,331,424 A | * | 7/1994 | Matsui et al. | 358/404 |
| 5,825,512 A | * | 10/1998 | Okita | 358/496 |
| 5,847,839 A | * | 12/1998 | Nakamura et al. | 358/404 |
| 6,025,584 A | * | 2/2000 | Yamada | 250/205 |
| 6,389,183 B1 | * | 5/2002 | Han | 382/313 |
| 6,459,499 B1 | * | 10/2002 | Tomat | 358/1.15 |
| 6,603,572 B1 | * | 8/2003 | Nakatani et al. | 358/1.2 |
| 6,614,564 B1 | * | 9/2003 | Sakaguchi | 358/487 |
| 6,724,949 B1 | * | 4/2004 | Yamazaki | 382/312 |

FOREIGN PATENT DOCUMENTS

JP   10116339   5/1998

* cited by examiner

*Primary Examiner*—Kanji Patel
(74) *Attorney, Agent, or Firm*—Morgan & Finnegan, LLP

(57) ABSTRACT

An image reading system is provide, which includes a reading apparatus for reading an original, and a host computer. The host computer includes a storage unit, a reading setting selection unit for selecting a reading setting in the reading apparatus, a setting changeing unit for changing the reading setting if the size of the image data is larger than the available area in the storage unit, a change content notification unit for notifying users of change contents before the setting change unit changes the reading setting, and a selection unit for choosing between continuing or not continuing the processing after notification from the change content notification unit. The setting changeing unit changes the reading setting in accordance with the contents from the content notification unit if the selection unit chooses to continue the processing, but holds the reading setting without changing the setting if the processing not continued.

20 Claims, 16 Drawing Sheets

← → INDICATES ADDRESS DATA BUS

← → INDICATES ADDRESS DATA BUS

FIG. 11

|  |  | 37 | 39 | 40 |

| Abe Scan | OK | × |

THE FOLLOWING SETTINGS CAN BE CURRENTLY MADE
ORIGINAL SIZE:      A6
READING SCHEME:   COLOR
RESOLUTION:         300dpi
DO YOU WANT TO CHANGE THE SETTINGS?
                                          ⟍ 38

INEQUALITY(1): (MEMORY)CAPACITY>(NECESSARY MEMORY CAPACITY+1)[MB]

INEQUALITY(1): (MEMORY)CAPACITY>(NECESSARY MEMORY CAPACITY+1)[MB]

FIG. 16

| Abe Scan | OK | × |

THE FOLLOWING SETTINGS CAN BE CURRENTLY MADE
ORIGINAL SIZE:      A6
READING SCHEME:  COLOR
RESOLUTION:         300dpi
DO YOU WANT TO CHANGE THE SETTINGS AND CONTINUE READING PROCESSING?

IMAGE READING SYSTEM, IMAGE READING SETTING DETERMINATION APPARATUS, READING SETTING DETERMINATION METHOD, RECORDING MEDIUM, AND PROGRAM

FIELD OF THE INVENTION

The present invention relates to an image reading technique and, more particularly, to a technique of determining an original reading setting.

BACKGROUND OF THE INVENTION

Conventionally, there is a system in which a personal computer (which may be abbreviated as a PC hereinafter) serves as a host, and peripheral equipment such as a reading apparatus (scanner) capable of reading an original is connected to the PC to transfer the image data read by the reading apparatus to the PC and store it as a image file in the PC. In such a system, the PC generally has a hard disk drive as a large-capacity storage unit capable of storing several GB data. For example, since the image data obtained by reading an A4 original at 300 color dpi has a size of about 24 MB, there is no chance of a shortage of an area for storing image data on the system, and hence no problem is posed in terms of the arrangement of the system.

Recently, as a simplified version of the PC described above, a simple personal computer (which may be referred to as a hand-held PC hereinafter) has been developed, which has only a memory (RAM) generally capable of storing data of several ten MB as a storage unit in place of a large-capacity storage unit such as a hard disk drive.

If, however, the above reading apparatus is connected as peripheral equipment to the recently developed hand-held PC, since the size of data that can be stored in the hand-held PC may be smaller than the size of read image data, various problems arise, e.g., a problem associated with the operation performed by the user and improper storage of data obtained by reading operation. In a reading apparatus capable of reading color images, in particular, read image data must be processed in almost the same unit of size as the capacity of the memory (RAM) of the hand-held PC. This makes it difficult to realize a system that can improve user operability and satisfactorily implement the function of the above reading apparatus.

In consideration of such problems, a system capable of improving the user operability and satisfactorily implementing the function of the reading apparatus is disclosed in Japanese Patent Laid-Open No. 10-116339, "Image Reading System and Information Recording Medium", filed by BROTHER INDUSTRIES, LTD. In this system, when image data to be read is larger than the available memory (RAM) capacity (corresponding to the free area of the data storage unit in the above reference) of the hand-held PC, the user operability can be improved and the function of the reading apparatus can be satisfactorily implemented by changing the reading setting (the reading condition in the above reference). However, the following steps are required to complete reading operation:

(1) setting an original;
(2) setting reading conditions;
(3) scanning the image;
(4) comparing the size of the image data to be read with the free area of the data storage unit;
(5) if the size of the image data to be read is lager than the free area of the data storage unit, changing the reading conditions to allow reading operation within the size range of the free area of the data storage unit (displaying the reading conditions after the change in a main window);
(6) scanning the image again; and
(7) terminating the reading operation.

As described above, however, seven steps are required to complete general reading operation. That is, cumbersome operation is required.

SUMMARY OF THE INVENTION

It is an object of the present invention to make a reading apparatus exhibit its maximum function and read an image even if a storage unit has a small available capacity.

In order to solve the above problems and achieve the above object, an image reading system according to the present invention has the following arrangement.

There is provided an image reading system characterized by comprising a reading apparatus capable of reading an original and a host computer, the host computer and the reading apparatus being connected to each other through an interface capable of two-way communication, the host computer including a storage unit having a finite capacity and capable of reading and writing data, a reading setting selection unit capable of selecting a reading setting in the reading apparatus, a setting changing unit for checking a size of an available area in the storage unit when reading is started in the reading apparatus, comparing the size of the available area with a size of image data read by the reading apparatus, and changing the reading setting in the reading setting selection unit if the size of the image data is larger, a change content notification unit for notifying a user of change contents before the setting changing unit changes the reading setting, and a selection unit for choosing between continuing processing and not continuing the processing after a notification is provided from the change content notification unit, wherein the setting changing unit changes the reading setting in accordance with the contents from the change content notification unit if the selection unit chooses to continue the processing, and holds the reading setting without changing the setting if the selection unit does not choose to continue the processing.

A reading setting determination apparatus according to the present invention has the following arrangement.

There is provided a setting determination apparatus characterized by comprising a storage unit having a finite capacity and capable of reading and writing data, a reading setting selection unit capable of selecting a reading setting in the reading apparatus, a setting changing unit for checking a size of an available area in the storage unit when reading is started in the reading apparatus, comparing the size of the available area with a size of image data read by the reading apparatus, and changing the reading setting in the reading setting selection unit if the size of the image data is larger, a change content notification unit for notifying a user of change contents before the setting changing unit changes the reading setting, and a selection unit for choosing between continuing processing and not continuing the processing after a notification is provided from the change content notification unit, wherein the setting changing unit changes the reading setting in accordance with the contents from the change content notification unit if the selection unit chooses to continue the processing, and holds the reading setting without changing the setting if the selection unit does not choose to continue the processing.

A reading setting determination method according to the present invention has the following arrangement.

There is provided a setting determination method characterized by comprising (a) the step of selecting a reading setting in a reading apparatus, (b) the step of checking a size of an available area in a storage unit when the reading apparatus starts reading, comparing the size of the available area with a size of image data read by the reading apparatus, and changing the reading setting if the size of the image data is larger, (c) the step of notifying a user of a change content before the reading setting is changed in the setting changing step, (d) the step of choosing between continuing processing and not continuing the processing after notification in the change content notification step, and (e) the step of changing the reading setting in accordance with the content in the change content notification step if continuation of the processing is selected in the selection step, and holding the reading setting without changing if continuation of the processing is not selected in the selection step.

A computer-readable recording medium according to the present invention has the following arrangement.

There is provided a computer-readable recording medium on which a program is recorded, the program causing a computer to execute (a) the step of selecting a reading setting in a reading apparatus, (b) the step of checking a size of an available area in a storage unit when the reading apparatus starts reading, comparing the size of the available area with a size of image data read by the reading apparatus, and changing the reading setting if the size of the image data is larger, (c) the step of notifying a user of a change content before the reading setting is changed in the setting changing step, (d) the step of choosing between continuing processing and not continuing the processing after notification in the change content notification step, and (e) the step of changing the reading setting in accordance with the content in the change content notification step if continuation of the processing is selected in the selection step, and holding the reading setting without changing if continuation of the processing is not selected in the selection step.

A program according to the present invention has the following arrangement.

There is provided a program for causing a computer to execute (a) the step of selecting a reading setting in a reading apparatus, (b) the step of checking a size of an available area in a storage unit when the reading apparatus starts reading, comparing the size of the available area with a size of image data read by the reading apparatus, and changing the reading setting if the size of the image data is larger, (c) the step of notifying a user of a change content before the reading setting is changed in the setting changing step, (d) the step of choosing between continuing processing and not continuing the processing after notification in the change content notification step, and (e) the step of changing the reading setting in accordance with the content in the change content notification step if continuation of the processing is selected in the selection step, and holding the reading setting without changing if continuation of the processing is not selected in the selection step.

An image reading apparatus according to the present invention has the following arrangement.

There is provided an image reading apparatus which can be used by being connected to an external controller through an interface capable of two-way communication, characterized in that the external controller including a storage unit having a finite capacity and capable of reading and writing data, a reading setting selection unit capable of selecting a reading setting in the reading apparatus, a setting changing unit for changing the reading setting in the reading setting selection unit, and a change content notification unit for providing a notification of a content of a change made by the setting changing unit, wherein when reading is started, a size of an available area in the storage unit is checked, the size of the available area is compared with a size of image data to be read, and if the size of the image data is larger, a change content is notified by the change content notification unit, and the setting changing unit changes the reading setting and continues reading operation.

An image reading method according to the present invention has the following arrangement.

There is provided an image reading method characterized by comprising the check step of checking a size of an available area in a storage unit having a finite capacity when an image reading apparatus starts reading, the comparison step of comparing the size of the available area with a size of image data read by the image reading apparatus, the changing step of changing a reading setting in the image reading apparatus if the size of the image data is larger, the notification step of providing a notification of a change content in the changing step, and the reading continuation step of continuing reading operation in the image reading apparatus after the notification is provided.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 11 is a view showing a setting change check message;

FIG. 16 is a view showing a setting change check message in the second embodiment.

DETAILED DESCRIPTION OF THE PREFERRED EMBODIMENTS

The embodiments of the present invention will be described in detail below with reference to the accompanying drawings.

In the following description, USB stands for Universal Serial Bus, which is a known interface capable of two-way communication, and hence a detailed description thereof will be omitted.

First Embodiment

Figure 1:
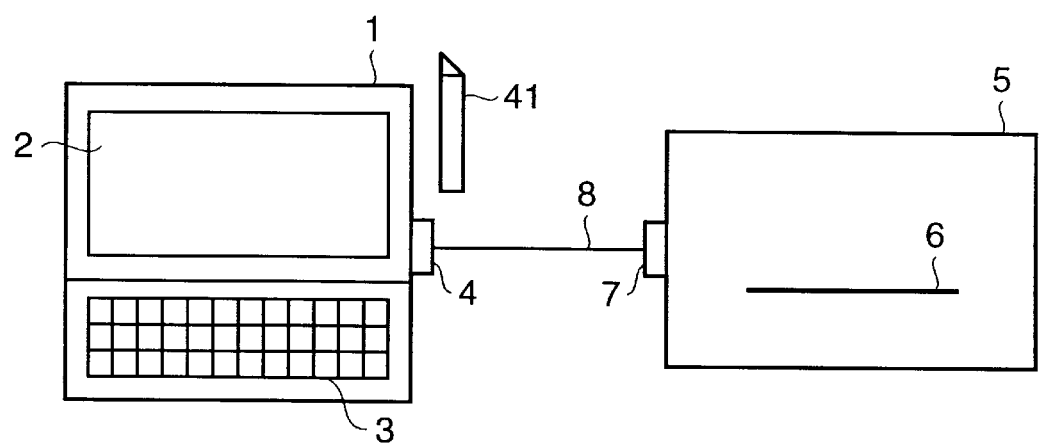
FIG. 1 is a view showing the arrangement of an image reading system according to an embodiment of the present invention.

FIG. 1 is a view showing the arrangement of an image reading system according to the first embodiment of the present invention. Referring to FIG. 1, reference numeral 1 denotes a hand-held PC equipped with Microsoft Windows CE as an OS; 2, a liquid crystal display; 3, a keyboard; 4, and a USB port (host). The liquid crystal display 2 is a touch panel on which operations such as dragging, dropping, and tapping are performed with a stylus 41 to realize the same function as that of a PC mouse. Reference numeral 5 denotes a sheet feed type color scanner; 6, an original insertion opening; and 7, a USB port (client). The hand-held PC 1 is connected to the color scanner 5 through a USB cable 8, so two-way communication of data can be performed between them.

Figure 2:
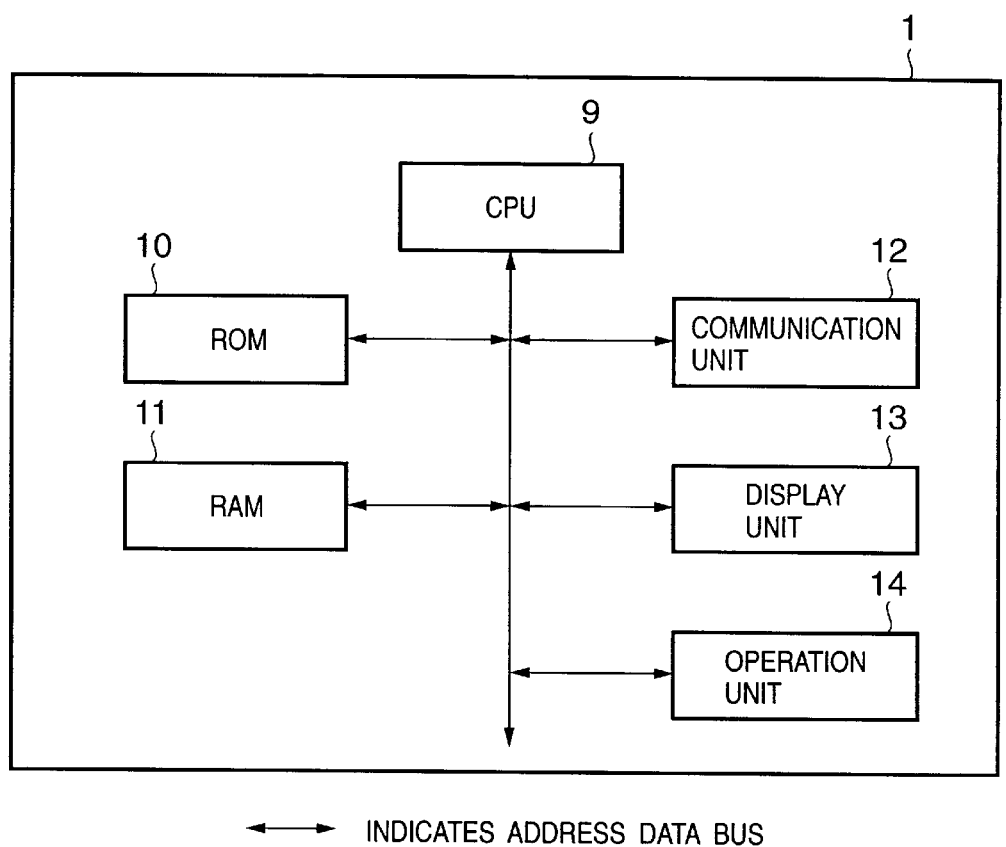
FIG. 2 is a block diagram showing the internal hardware arrangement of a hand-held PC 1.

FIG. 2 is a block diagram showing the internal hardware arrangement of the hand-held PC 1. The hand-held PC 1 is a portable terminal used as a simple PC, which is mainly characterized in that it does not have a large-capacity storage unit such as a hard disk drive (in general, a unit capable of storing several GB data). Referring to FIG. 2, reference numeral 9 denotes a CPU formed by a microprocessor or the like, which serves as the central processing unit of the hand-held PC 1 and controls a RAM 11, communication unit 12, display unit 13, and operation unit 14 in accordance with the programs stored in a ROM 10. The ROM 10 stores the OS, device drivers for controlling the display and ports, and applications that can be activated on the hand-held PC 1. The RAM 11 generally has a capacity of about 32 Mb. The first half of this capacity is assigned to the execution of programs, and the second half is assigned to data storage. The communication unit 12 includes the USB port 4 and controls USB communication. The display unit 13 includes the liquid crystal display 2 and controls, for example, display operation of a user interface (which may be referred to as the UI hereinafter) for an application or the like. The operation unit 14 includes the keyboard 3 and controls key input operation.

Figure 3:
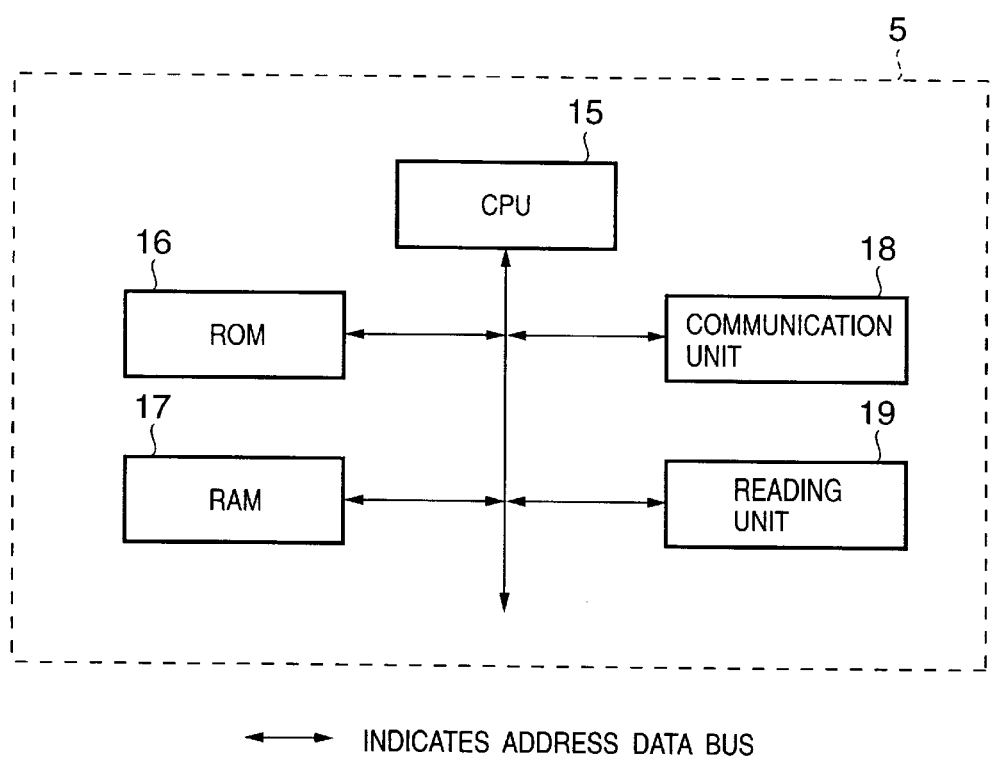
FIG. 3 is a block diagram showing the internal hardware arrangement of a scanner 5.

FIG. 3 is a block diagram showing the internal hardware arrangement of the scanner 5. Referring to FIG. 5, reference numeral 15 denotes a CPU formed by a microprocessor or the like, which serves as the central processing unit of the scanner 5 and controls a RAM 17, communication unit 18, and reading unit 19 in accordance with the programs stored in a ROM 16. The ROM 16 stores a program for causing the scanner 5 to perform reading operation under the control of a scanner application 20 (to be described later with reference to FIG. 4). The image data read by the reading unit 19 is mainly and temporarily stored in the RAM 17. The communication unit 18 includes the USB port 7 and controls USB communication. The reading unit 19 includes the original insertion opening 6 and is comprised of a reading unit constituted by a CCD and the like, an ASIC for processing read data into image data, and the like. An original inserted through the original insertion opening 6 is read under the control of the scanner application 20, and the read data is processed into image data. This data is temporarily stored in the RAM 17 and sent from the USB port 7 to the hand-held PC 1 through the USB interface. The image data received by the hand-held PC 1 is stored in the data storage area of the RAM 11.

Figure 4:
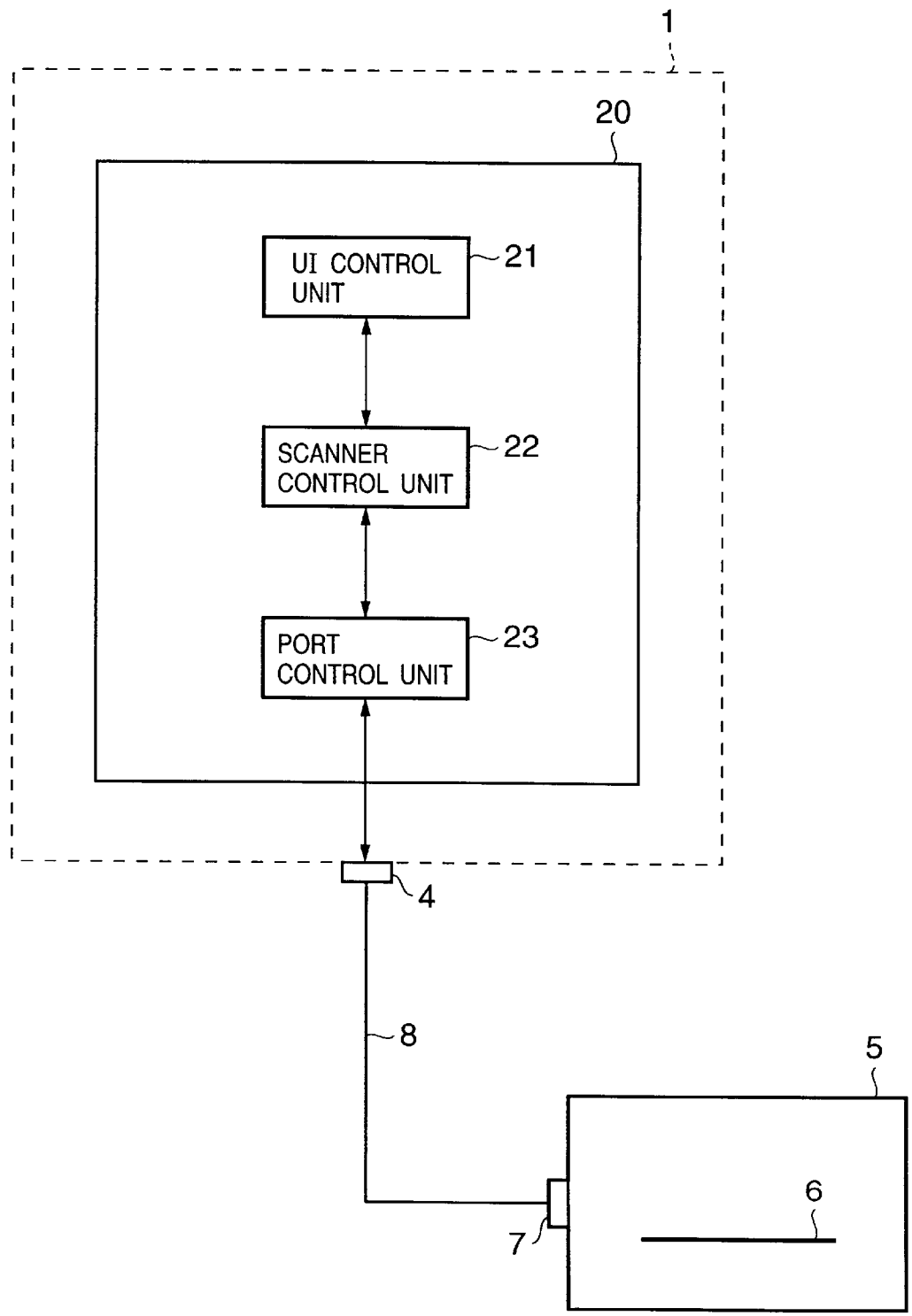
FIG. 4 is a block diagram showing the arrangement of a scanner application for controlling the scanner 5.
Figure 5:
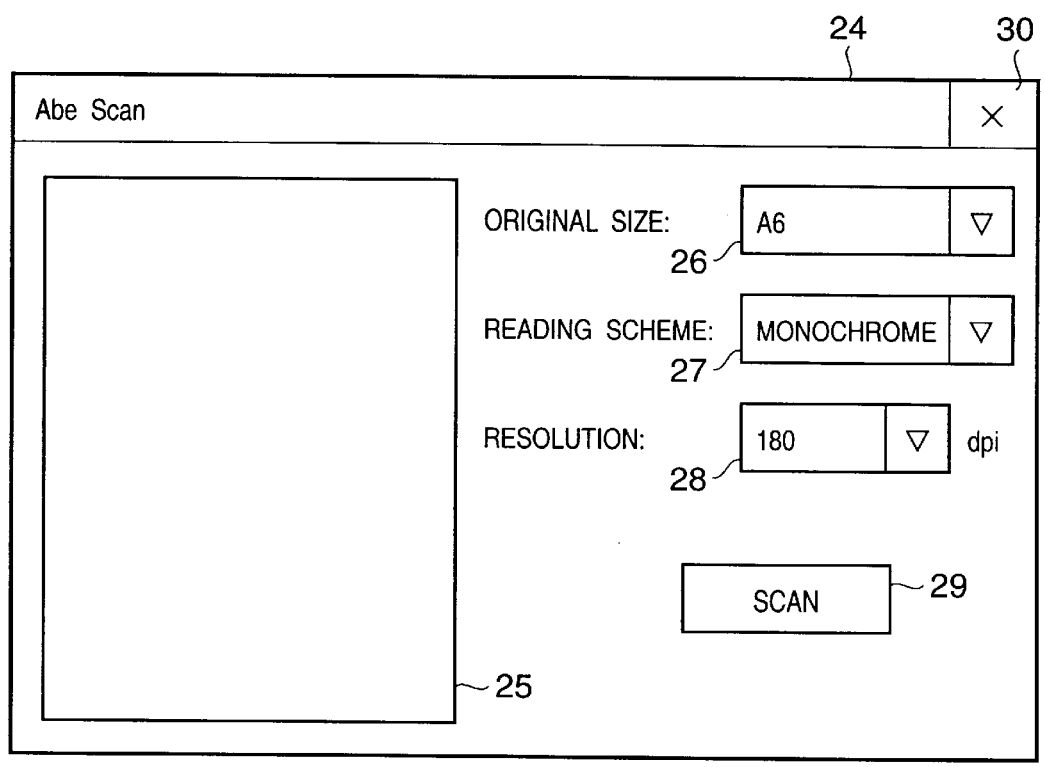
FIG. 5 is a view showing the UI of a scanner application 20.

FIG. 4 is a block diagram showing the arrangement of a scanner application for controlling the scanner 5. Referring to FIG. 4, each arrow indicates the flow of data. The scanner application 20 is stored in the ROM 10 of the hand-held PC 1. Reference numeral 21 denotes a UI control unit for controlling the UI of the scanner application 20; 22, a scanner control unit for controlling the scanner 5 by sending a control command to the scanner 5 in accordance with an instruction from the UI control unit or notifying the UI control unit of the state of the scanner 5 on the basis of a response command from the scanner 5; and 23, a port control unit for mainly controlling ports from the viewpoint of an application level by writing a control command issued from the scanner control unit 22 on the communication unit 12 or reading a response command from the scanner 5 through the communication unit 12.

FIG. 5 is a view showing the UI of the scanner application 20, which is displayed on the liquid crystal display 2 of the hand-held PC 1 while the scanner application 20 is active. FIG. 5 shows the contents displayed during a standby period of the scanner 5. Referring to FIG. 5, reference numeral 24 denotes a main window; 25, a viewer for displaying the image data read by the scanner 5; 26, an original size selection portion which is formed by a combo box and allows the user to select one of three types of original sizes, i.e., A6, A5, and A4; 27, a reading scheme selection portion which is formed by a combo box and allows the user to select one of three types of reading schemes, i.e., monochrome, grayscale, and color; 28, a resolution selection portion which is formed by a combo box and allows the user to select one of the following resolutions: 90 dpi, 180 dpi, 200 dpi, 300 dpi, and 360 dpi; and 29, an operation button that serves as a scan button except when an image is read, and as a cancel button during image reading operation. The character string display on the operation button 29 also changes. Referring to FIG. 5, the character string "scan" is displayed. When the operation button 29 is clicked in this state, image reading starts. Reference numeral 30 denotes a close button for closing the main window 24 and terminating the scanner application 20. A combination of settings in the original size selection portion 26, reading scheme selection portion 27, and resolution selection portion 28 will be referred to as a reading setting hereinafter.

Figure 6:
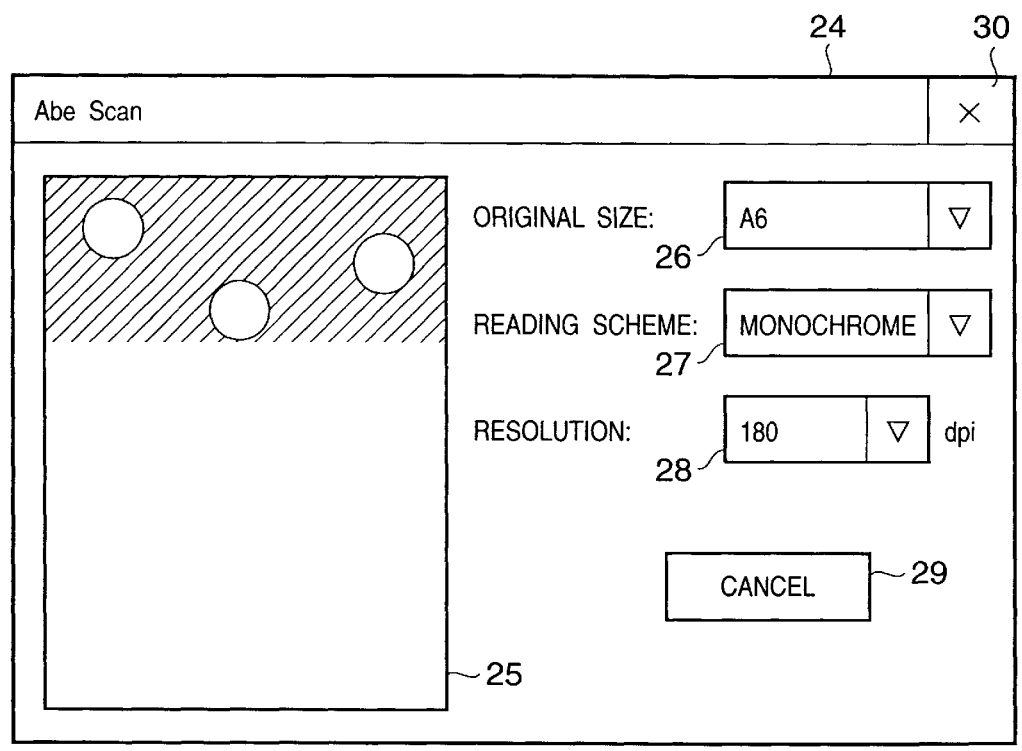
FIG. 6 is a view showing the UI of the scanner application 20.

FIG. 6 is a view showing the UI of the scanner application 20, and more specifically, display contents during image reading operation of the scanner 5. Referring to FIG. 6, image data that is being read (during reading operation) is displayed on the viewer 25, and the character string "cancel" is displayed on the operation button 29. When the operation button 29 is clicked in this state, the image reading operation is stopped, and the image that has been read so far is discarded.

Figure 7:
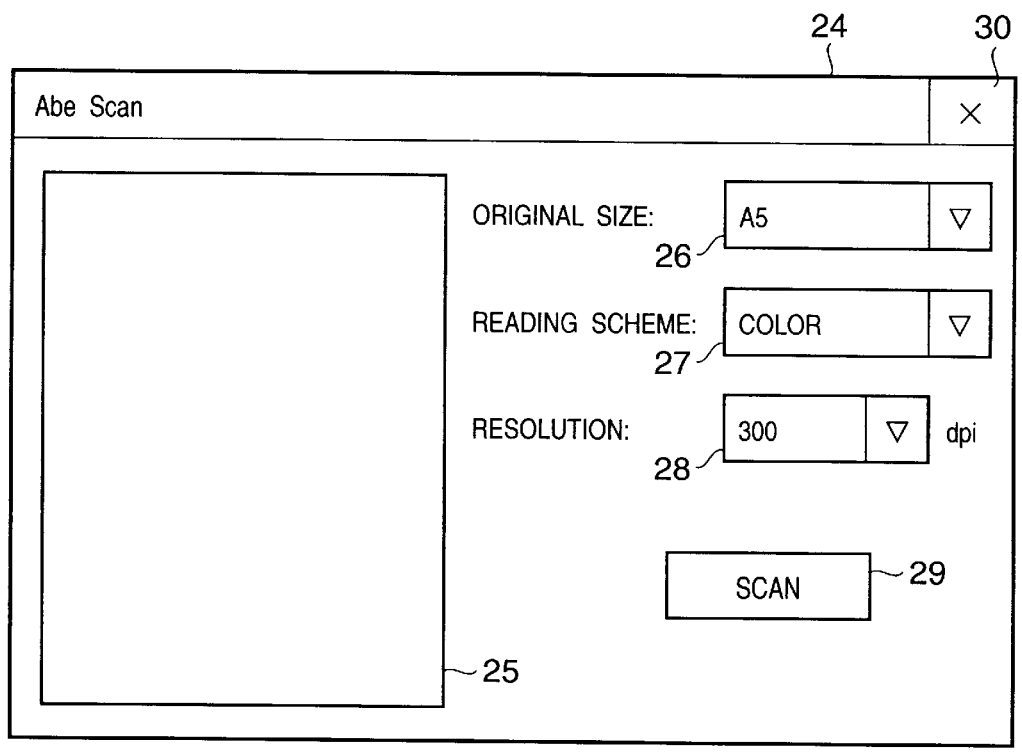
FIG. 7 is a view showing the UI of the scanner application 20 during a standby period of the scanner 5.

FIG. 7 is a view showing the UI of the scanner application 20 during a standby period of the scanner 5, and more specifically, a state in which original size: A5, reading scheme: color, and resolution: 300 dpi are set.

Figure 8:
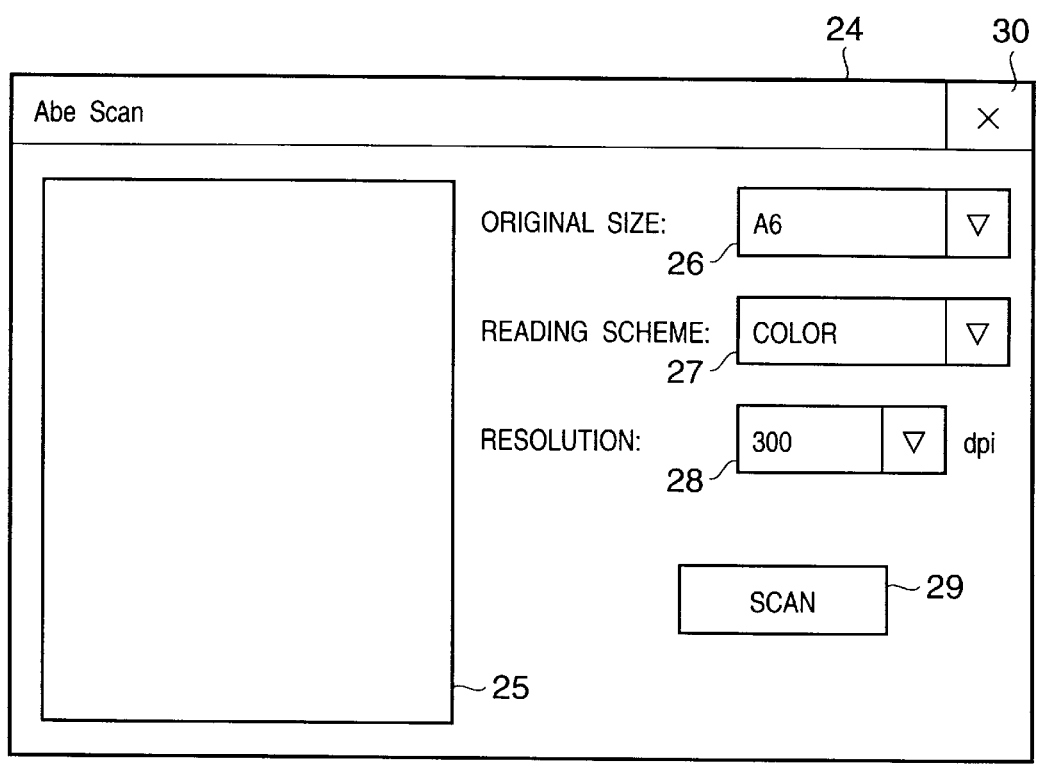
FIG. 8 is a view showing the UI of the scanner application 20 during a standby period of the scanner 5.

FIG. 8 is a view showing the UI of the scanner application 20 during a standby period of the scanner 5, and more specifically, a state in which original size: A6, reading scheme: color, and resolution: 300 dpi are set.

Figure 9:
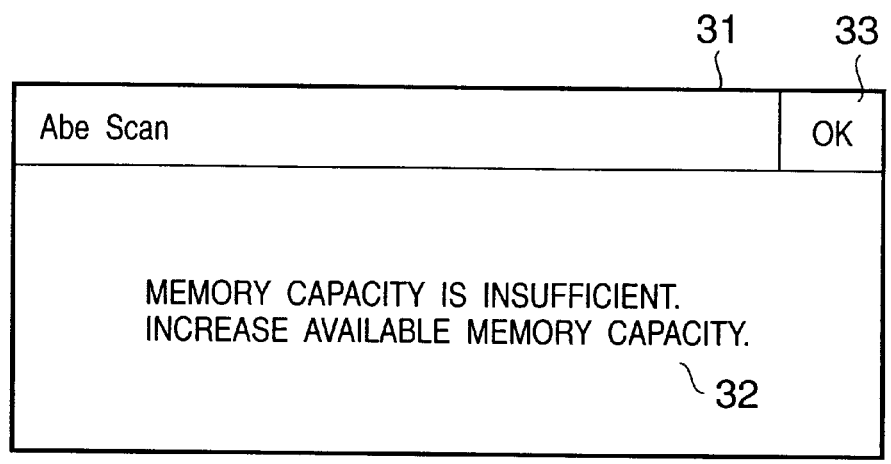
FIG. 9 is a view showing an out-of-memory warning message.

FIG. 9 is a view showing an out-of-memory warning message displayed on the main window 24 of the scanner application 20. Referring to FIG. 9, reference numeral 31 denotes an out-of-memory warning message comprised of a message character string 32 and OK button 33. This message is displayed when the available memory (RAM 11) capacity of the hand-held PC 1 is insufficient, and a necessary memory area corresponding to a reading setting cannot be ensured. When the OK button 33 is clicked, the screen is restored to the main window 24.

Figure 10:
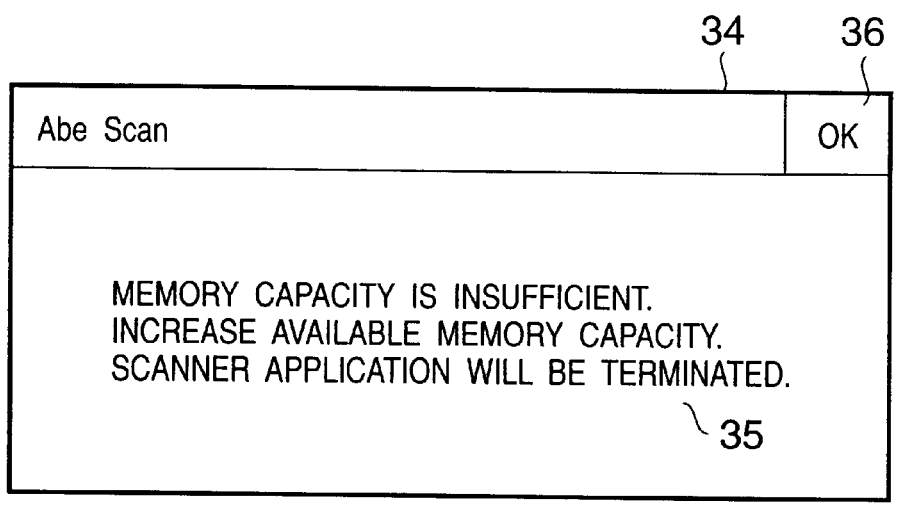
FIG. 10 is a view showing an out-of-memory error message.

FIG. 10 is a view showing an out-of-memory error message displayed on the main window 24 of the scanner application 20. Referring to FIG. 10, reference numeral 34 denotes an out-of-memory error message comprised of a message character string 35 and OK button 36. This message is displayed when the available memory (RAM 11) capacity of the hand-held PC 1 is insufficient, and the available memory capacity required in a reading setting for the minimum size of image data is insufficient. When the OK button 36 is clicked, the screen is restored to the main window 24.

FIG. 11 is a view showing a setting change check message displayed on the main window 24 of the scanner application 20. Referring to FIG. 11, reference numeral 37 denotes a setting change check message comprised of a message character string 38, OK button 39, and a cancel button 40. This message is displayed after the out-of-memory warning message 31 is displayed. When the OK button 39 is clicked, the reading setting is changed in accordance with the settings of the message character string 38, and the screen is restored to the main window. When the cancel button 40 is clicked, the screen is restored to the main window without changing the reading setting.

Figure 12:
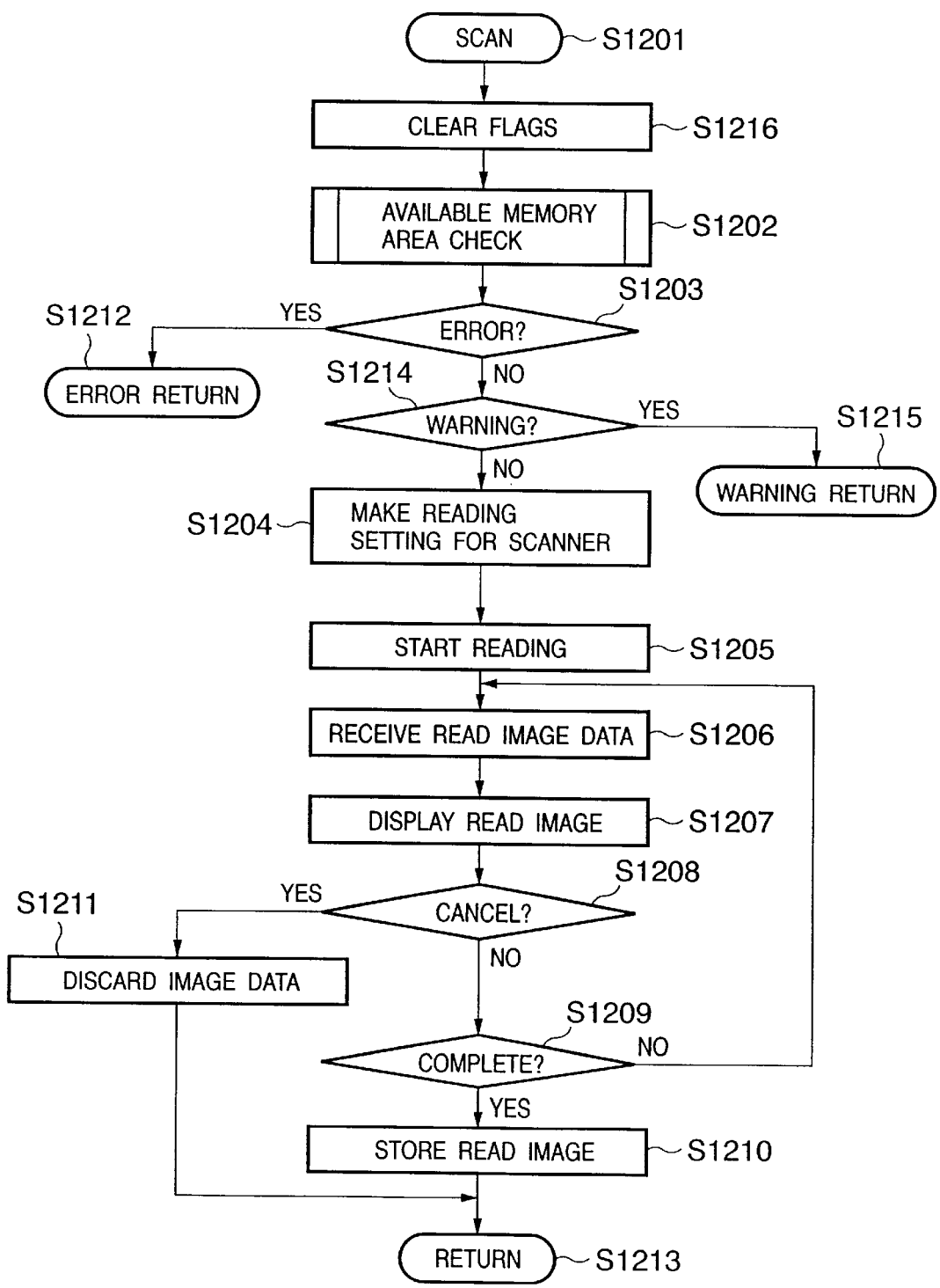
FIG. 12 is a flow chart showing processing after reading is started.
Figure 13:
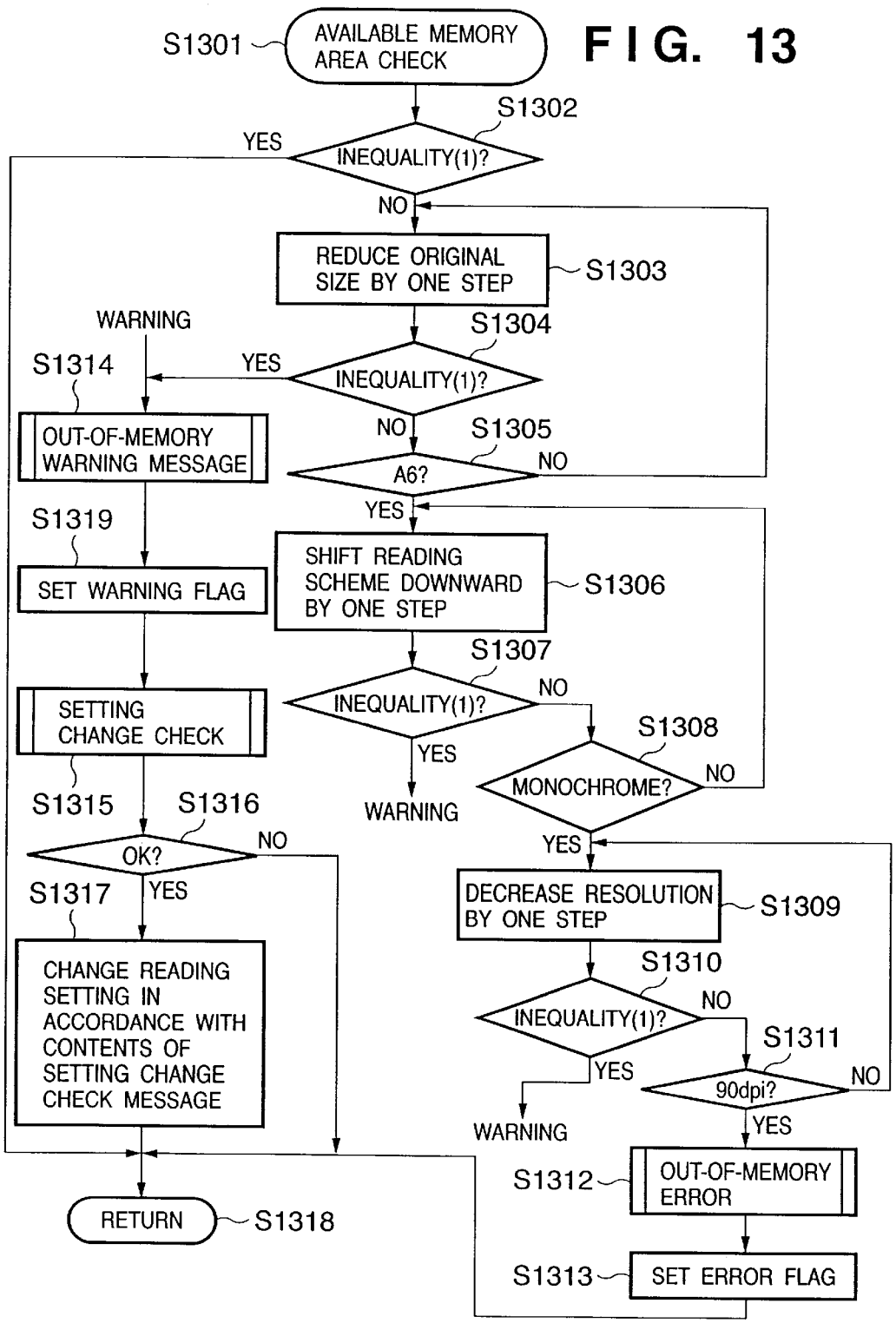
FIG. 13 is a flow chart showing processing in an available memory area check.

FIGS. 12 and 13 are flow charts showing the operation (processing) of this embodiment. The operation will be described with reference to FIGS. 12 and 13. FIG. 12 is a flow chart showing processing after reading operation is started by clicking the operation button 29. When scanning is started by clicking the operation button 29 (step S1201), an error flag and warning flag are cleared (step S1216), and an available memory area check is made (step S1202). If an error is detected by the available memory area check (an error flag is set) (step S1203), the reading processing is stopped, and an error return is executed (step S1211). As described above, if an error is detected by an available memory area check, since scanning cannot be performed, reading operation is forcibly stopped to prevent the OS from malfunctioning.

If no error is detected (the error flag is cleared) in step S1203, and a warning is determined (the warning flag is set) by the available memory area check (step S1214), the reading processing is stopped, and a warning return is executed (step S1215). If no warning is determined (the warning flag is cleared) in step S1214, a reading setting is made for the scanner 5 in accordance with the reading setting on the main window 24 (step S1204). Thereafter, reading of the original set in the original insertion opening 6 is started (step S1205), and the read image data is received and temporarily stored in the data storage area of the memory (RAM 11) (step S1206). The read image is then displayed on the viewer 25 on the basis of the data (step S1207).

If the operation button 29 is clicked during the reading operation to stop reading the image (step S1208), the image data temporarily stored is discarded (step S1211), and the screen is restored to the main window 24 (step S1213). If it is determined in step S1208 that the image reading operation is continued, and the reading operation is not complete (step S1209), the flow returns to step S1206 to continue the reading operation.

If it is determined in step S1209 that the image reading operation is complete, the image that is read and temporarily stored is converted into an image file in bitmap file form and stored in the data storage area of the memory (RAM 11) (step S1210). The screen is then restored to the main window 24 (step S1213).

If the scanner application 20 accepts the error return (step S1212), the scanner application 20 is terminated. If the scanner application 20 accepts a return other than the error return (step S1213 or S1215), the screen is restored to the main window 24.

FIG. 13 is a flow chart showing the processing in the available memory area check in step S1202 in FIG. 12. In the following description, processing expressed with the word "virtually" is processing that is not reflected on the main window 24 at that point of time. When the operation button 29 is clicked during the standby state of the scanner 5 to start scanning, and an available memory area check is started (step S1301), a check is made (step S1302) on available capacity of data storage area of memory $$(RAM\ 11) > (necessary\ memory\ capacity + 1)\ [MB] \qquad (1)$$

If an available memory area (RAM 11) is ensured, the flow advances to the next step (step S1318). In the right-hand side of inequality (1), (necessary memory capacity+1) is set. This value "1" is a margin, which is not used in general. If it is determined in step S1302 that the available memory area (RAM 11) is insufficient, the original size is virtually reduced by one step (in order of A4→A5→A6) in internal processing (step S1303).

Inequality (1) is then checked (step S1304). If a necessary available memory area (RAM 11) is ensured, the flow advances to "Warning". If it is determined in step S1304 that the available memory area (RAM 11) is insufficient, and the (virtual) original size A6 is not set (step S1305), the flow returns to step S1303. If it is determined in step S1305 that the (virtual) original size is set to A6, the reading scheme is virtually shifted downward by one step (in order of color→grayscale→monochrome) in internal processing (step S1306).

Inequality (1) is then checked (step S1307). If it is determined that a necessary available memory area (RAM 11) can be ensured, the flow advances to "Warning". If it is determined in step S1307 that the available memory area (RAM 11) is insufficient, and the (virtual) reading scheme is not monochrome (step S1308), the flow returns to step S1306. If it is determined in step S1308 that the (virtual) reading scheme is monochrome, the resolution is virtually decreased by one step (in order of 360→300→200→180→90 dpi) in internal processing (step S1309).

Subsequently, inequality (1) is checked (step S1310). If a necessary available memory area (RAM 11) can be ensured, the flow advances to "Warning". If it is determined in step S1310 that the available memory area (RAM 11) is insufficient, and the (virtual) resolution is not 90 dpi (step S1311), the flow returns to step S1309. If it is determined in step S1311 that the (virtual) resolution is 90 dpi, the out-of-memory error message 34 is displayed (step S1312), and the error flag is set after the OK button 36 is clicked (step S1313). The flow then advances to the next step (step S1318).

As described above, the image size is decreased by changing the reading setting in order of the original size, reading scheme, and resolution. This makes it possible to quickly and effectively determine a reading setting corresponding to an available memory area (RAM 11) with importance placed on user's purpose. In "Warning", the out-of-memory warning message 31 is displayed (step S1314), and the warning flag is set after the OK button 33 is clicked (step S1319). The setting change check message 37 is then displayed (step S1315). If the OK button 39 is clicked on the setting change check message 37 (step S1316), the reading setting on the main window 24 is changed in accordance with the contents of the message character string 38 of the setting change check message 37 (step S1317), and the flow advances to the next step (step S1318). If the cancel button 40 is clicked on the setting change check message 37 (step S1316), the flow advances to the next step (step S1318) without performing any processing.

As described above, even if the available memory area (RAM 11) is insufficient, a reading setting corresponding to the available memory area (RAM 11) is determined, and the user is notified of this setting through the setting change check message 37. This allows the user to continue the reading processing with simple operation while easily grasping the reading setting that allows reading operation. If the user is not satisfied with the contents of the message character string 38 of the setting change check message 37, he/she can arbitrarily change the reading setting with reference to the contents of the message character string 38 by clicking the cancel button 40 without immediately changing the reading setting.

As described above, the hand-held PC 1 does not have any large-capacity storage unit like a hard disk driver, and has only the RAM 11 as a storage unit. This imposes a limitation on the amount data that can be stored in the data storage area in the memory (RAM 11) in accordance with user's application purpose. If peripheral equipment desired to process a large volume of data, such as the scanner 5, is connected to the hand-held PC 1, in particular, the function of the peripheral equipment cannot be satisfactorily implemented, or the user cannot grasp the limited function. This embodiment has been made in consideration of such a problem. Even if peripheral equipment designed to process a large volume of data, e.g., the scanner 5, is connected to the hand-held PC 1, a maximum function can be easily implemented within a limited range, and the user can grasp the limited function, thus improving the operability. Such a case will be described below.

Assume that the data storage area in the RAM 11 of the hand-held PC 1 has a capacity of 10 MB. In this state, the scanner application 20 is activated in the arrangement shown in FIG. 1, and the reading setting shown in FIG. 7 is determined. In this case, an image size of about 11.8 MB is calculated, and hence the data storage area of the memory (RAM 11) needs to have an available capacity of 12.8 MB. If the operation button 29 is clicked to start reading in this state, the flow advances from step S1201 to step S1202 in FIG. 12. In the flow chart in FIG. 13, which shows processing in an available memory area check, NO is obtained in determination processing for inequality (1) in step S1302, and the flow advances to step S1303. When the original size is virtually decreased by one step (A5→A6) in internal processing in step S1303, an image size of about 5.7 MB is calculated, and hence the data storage area of the memory (RAM 11) needs to have an available capacity of 6.7 MB according to inequality (1). YES is obtained in determination processing for inequality (1) in step S1304, and the out-of-memory warning message 31 is displayed (step S1314). If the OK button 33 is clicked, the warning flag is set (step S1319), and the setting change check message 37 is displayed (step S1315). If the OK button 39 is clicked (step S1316), the reading setting on the main window 24 is changed in accordance with the contents of the message character string 38 of the setting change check message 37 (step S1317).

FIG. 8 shows the contents displayed on the main window 24 at this point of time. When the flow advances to the next step (step S1318), since the warning flag is set, YES is obtained in step S1214 in FIG. 12. A warning return is then executed (step S1215), and the screen is restored to the main window 24 (FIG. 8). When the operation button 29 is clicked afterward, reading operation is started. The reading operation is normally completed without causing an error or generating a warning in step S1202 in FIG. 12.

The operation of this embodiment in each state has been described above. In this embodiment, when peripheral equipment such as the scanner 5 which requires processing of a large volume of data is connected to the hand-held PC 1 having no large-capacity storage unit like a hard disk drive, the available memory area (RAM 11) is checked at the start of reading operation with a given reading setting. If the available memory area is not sufficient, a reading setting that allows reading operation is automatically determined in accordance with the available capacity, and the setting change check message 37 indicating the contents of this setting is displayed for the user to review. This makes it possible to easily change the setting.

If the available memory area of the memory (RAM 11) is insufficient, two measures may be taken. The first measure is to read upon changing the reading setting. The second measure is to read after increasing the available memory area of the memory (RAM 11) by deleting unnecessary files in the memory (RAM 11) without changing the reading setting. It is preferable that the user can arbitrarily select one of the two measures.

According to this embodiment, when the available memory area of the memory (RAM 11) is insufficient, the reading setting is virtually changed to a reading setting that allows reading operation with the available memory area, and the reading setting after the change is displayed for the user. When the user consents to the change to the reading setting and clicks the OK button, reading is performed with the reading setting after the change. With this operation, the first measure is executed.

If the user does not consent to the change to the above reading setting and clicks the cancel button, the reading setting is not changed. Thereafter, the user deletes unnecessary files in the memory (RAM 11) to increase the available capacity of the memory (RAM 11). When the user gives an instruction to start reading, the original can be read without changing the reading setting. With this operation, the second measure is executed.

If the reading setting is forcibly changed without checking whether the user consents to a change, the operability is excessively poor for the user who does not want the change. More specifically, if the reading setting is forcibly changed, the user becomes uncertain about the reading setting before the change. This makes it difficult to restore the initial reading setting. According to this embodiment, since the user can cancel a change of a reading setting, he/she can hold the initial reading setting and allows the original to be read with the initial reading setting without any change if so desired.

This embodiment has exemplified the color scanner 5 as peripheral equipment. However, the present invention is not limited to this and can be effectively applied to another peripheral equipment having a similar function, e.g., a digital camera. Obviously, the present invention can be effectively applied to a monochrome scanner as well as a color scanner. In addition, the present invention is not limited to a sheet feed type scanner and can be effectively applied to an arbitrary apparatus that can achieve a similar purpose, e.g., a flat-bed scanner.

In this embodiment, Microsoft Windows CE is used as an OS. However, the present invention is not limited to this and can be implemented by using an arbitrary OS by having a similar arrangement.

In this embodiment, the USB (Universal Serial Bus) interface is used as an interface between the hand-held PC 1 and the scanner 5. However, the present invention is not limited to this and can be implemented by an arbitrary interface by having a similar arrangement.

As has been described above, according to this embodiment, the following effects can be obtained:

(1) The function of the reading apparatus can be easily maximized within a limited range, and the user can grasp the function, thereby improving the operability.

(2) A reading setting near the reading setting desired by the user can be automatically set without user performing cumbersome operation, and reading processing can be easily completed.

(3) The user can easily grasp the details of a reading setting. This allows the user to easily find a reading setting which is as similar to the desired reading setting as possible and allows reading operation.

(4) A reading setting that allows reading operation can be quickly and effectively determined with importance attached to user's purpose.

(5) Malfunctioning of the OS can be prevented.

(6) The user can continue reading processing with simple operation while easily grasping a reading setting that allows reading operation.

(7) If the user is not satisfied with the notified contents of a change in reading setting, he/she can arbitrarily change the reading setting with reference to the notified reading setting as the reading setting is not immediately changed.

Second Embodiment

The apparent hardware arrangement of an image reading system of the second embodiment is the same as that of the first embodiment, and they differ only in their operations. Therefore, the same reference numerals as in the first embodiment denote the same parts in the second embodiment, and a description thereof will be omitted. Only the differences between the operations will be described below.

In the first embodiment, when the setting change check message 37 is displayed, and the OK button 39 is clicked, the screen is restored to the main window 24. When the operation button 29 on the main window 24 is clicked again, an original is read. In this embodiment, when a setting change check message 37 is displayed, and an OK button 39 is clicked, an original is automatically read with the contents of the change displayed on the setting change check message 37 without operating an operation button 29 again.

This embodiment will be described in detail below with reference to the accompanying drawings.

The main flow chart for the operation of the image reading system of this embodiment is the same as the flow chart shown in FIG. 12 in the first embodiment, and a description thereof will be omitted.

Figure 14:
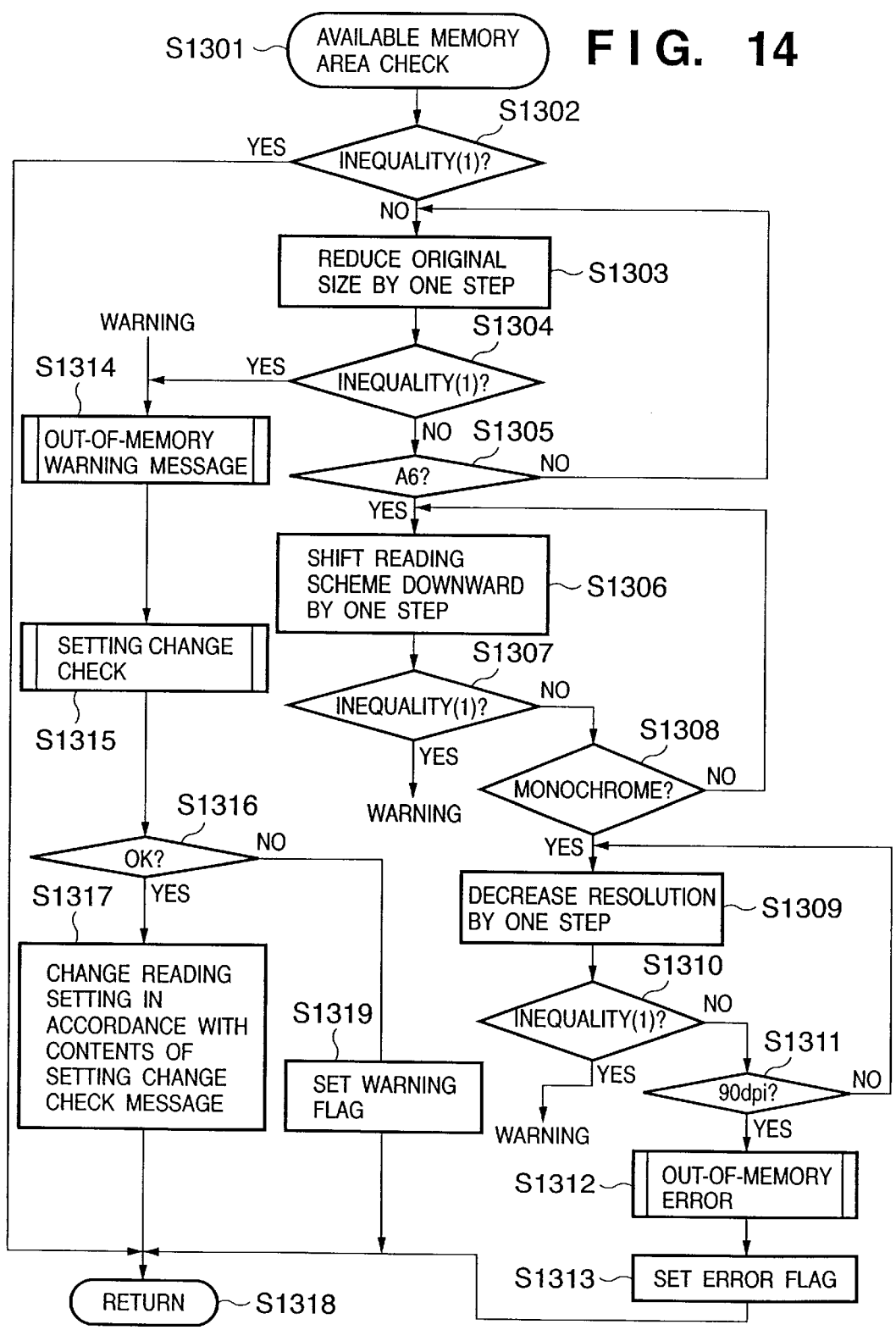
FIG. 14 is a flow chart showing processing in an available memory area check in the second embodiment.

FIG. 14 is a flow chart showing processing in the available memory area check in step S1202 in FIG. 12. In the following description, processing expressed with the word "virtually" is processing that is not reflected on a main window 24 at that point of time. When the operation button 29 is clicked during the standby state of a scanner 5 to start scanning, and an available memory area check is started (step S1301), a check is made (step S1302) on $$\text{available capacity of data storage area of memory (RAM 11)} > (\text{necessary memory capacity}+1) \text{ [MB]} \quad (1)$$

If an available memory area (RAM 11) is ensured, the flow advances to the next step (step S1318). In the right-hand side of inequality (1), (necessary memory capacity+1) is set. This value "1" is a margin, which is not used in general. If it is determined in step S1302 that the available memory area (RAM 11) is insufficient, the original size is virtually reduced by one step (in order of A4→A5→A6) in internal processing (step S1303).

Inequality (1) is then checked (step S1304). If a necessary available memory area (RAM 11) is ensured, the flow advances to "Warning". If it is determined in step S1304 that the available memory area (RAM 11) is insufficient, and the (virtual) original size A6 is not set (step S1305), the flow returns to step S1303. If it is determined in step S1305 that the (virtual) original size is set to A6, the reading scheme is virtually shifted downward by one step (in order of color→grayscale→monochrome) in internal processing (step S1306).

Inequality (1) is then checked (step S1307). If it is determined that a necessary available memory area (RAM 11) can be ensured, the flow advances to "Warning". If it is determined in step S1307 that the available memory area (RAM 11) is insufficient, and the (virtual) reading scheme is not monochrome (step S1308), the flow returns to step S1306. If it is determined in step S1308 that the (virtual) reading scheme is monochrome, the resolution is virtually decreased by one step (in order of 360→300→200→180→90 dpi) in internal processing (step S1309).

Subsequently, inequality (1) is checked (step S1310). If a necessary available memory area (RAM 11) can be ensured, the flow advances to "Warning". If it is determined in step S1310 that the available memory area (RAM 11) is insufficient, and the (virtual) resolution is not 90 dpi (step S1311), the flow returns to step S1309. If it is determined in step S1311 that the (virtual) resolution is 90 dpi, the out-of-memory error message 34 is displayed (step S1312), and the error flag is set after an OK button 36 is clicked (step S1313). The flow then advances to the next step (step S1318).

As described above, the image size is decreased by changing the reading setting in order of the original size, reading scheme, and resolution. This makes it possible to quickly and effectively determine a reading setting corresponding to an available memory area (RAM 11) with importance placed on user's purpose. In "Warning", an out-of-memory warning message 31 is displayed (step S1314), and a setting change check message 37 like the one shown in FIG. 16 is displayed after an OK button 33 is clicked (step S1315). If the OK button 39 is clicked on the setting change check message 37 (step S1316), the reading setting on the main window 24 is changed in accordance with the contents of a message character string 38 of the setting change check message 37 (step S1317), and the flow advances to the next step (step S1318). If the cancel button 40 is clicked on the setting change check message 37 (step S1316), the warning flag is set (step S1319), and the flow advances to the next step (step S1318).

As described above, even if the available memory area (RAM 11) is insufficient, a reading setting corresponding to the available memory area (RAM 11) is determined, and the user is notified of this setting through the setting change check message 37. This allows the user to continue the reading processing with simple operation while easily grasping the reading setting that allows reading operation. If the user is not satisfied with the contents of the message character string 38 of the setting change check message 37, he/she can arbitrarily change the reading setting with reference to the contents of the message character string 38 by clicking the cancel button 40 without immediately changing the reading setting.

As described above, a hand-held PC 1 does not have any large-capacity storage unit like a hard disk driver, and has only the RAM 11 as a storage unit. This imposes a limitation on the amount data that can be stored in the data storage area in the memory (RAM 11) in accordance with user's application purpose. If peripheral equipment desired to process a large volume of data, such as the scanner 5, is connected to the hand-held PC 1, in particular, the function of the peripheral equipment cannot be satisfactorily implemented, or the user cannot grasp the limited function. This embodiment has been made in consideration of such a problem. Even if peripheral equipment designed to process a large volume of data, e.g., the scanner 5, is connected to the hand-held PC 1, a maximum function can be easily implemented within a limited range, and the user can grasp the limited function, thus improving the operability. Even if the available data storage area in the memory (RAM 11) is insufficient in reading processing with the reading setting set by the user, a proper reading setting is determined within the available memory capacity, and the user is notified of this setting. If the OK button is clicked, the reading setting is automatically changed to this reading setting, and the reading processing is continued. This makes it possible to continue desired reading operation with simple operation and complete it. An example of this operation will be described below.

Figure 15:
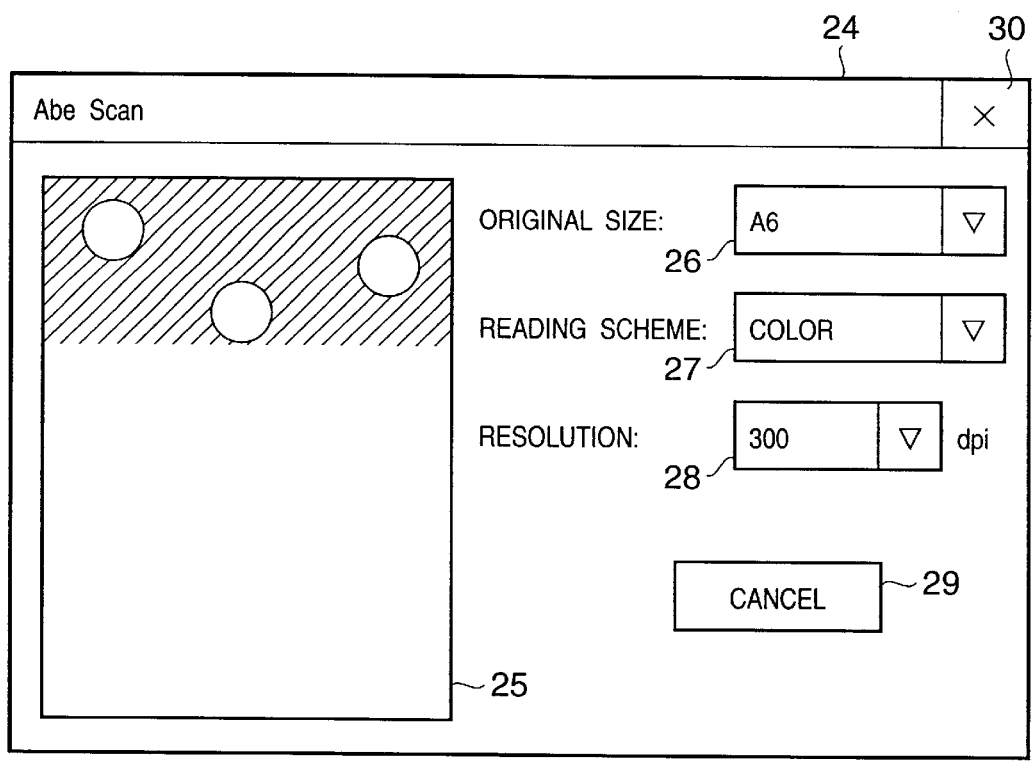
FIG. 15 is a view showing the UI of a scanner application during image reading operation of the scanner.

Assume that the data storage area in the RAM 11 of the hand-held PC 1 has a capacity of 10 MB. In this state, a scanner application 20 is activated in the arrangement shown in FIG. 1, and the reading setting shown in FIG. 7 is determined. In this case, an image size of about 11.8 MB is calculated, and hence the data storage area of the memory (RAM 11) needs to have an available capacity of 12.8 MB. If the operation button 29 is clicked to start reading in this state, the flow advances from step S1201 to step S1202 in FIG. 12. In the flow chart in FIG. 13, which shows processing in an available memory area check, NO is obtained in determination processing for inequality (1) in step S1302, and the flow advances to step S1303. When the original size is virtually decreased by one step (A5→A6) in internal processing in step S1303, an image size of about 5.7 MB is calculated, and hence the data storage area of the memory (RAM 11) needs to have an available capacity of 6.7 MB according to inequality (1). YES is obtained in determination processing for inequality (1) in step S1304, the out-of-memory warning message 31 is displayed (step S1314). If the OK button 33 is clicked, the setting change check message 37 shown in FIG. 16 is displayed (step S1315). If the OK button 39 is clicked (step S1316), the reading setting on the main window 24 is changed in accordance with the contents of the message character string 38 of the setting change check message 37 (step S1317). When the flow advances to the next step (step S1318), since the warning flag is cleared in step S1214 in FIG. 12, the flow advances to "NO" to make a reading setting for the scanner 5 in accordance with the reading setting on the main window 24 (step S1204). Thereafter, reading of the original set in an original insertion opening 6 is started (step S1205). Even if the available capacity of the memory (RAM 11) is insufficient, the reading setting is automatically changed to a proper reading setting, and the reading processing is continued, thus normally completing the reading operation. FIG. 15 shows the contents displayed on the main window during reading operation in the above case.

The operation of this embodiment in each state has been described above. In this embodiment, when peripheral equipment such as the scanner 5 which requires processing of a large volume of data is connected to the hand-held PC 1 having no large-capacity storage unit like a hard disk drive, the available memory area (RAM 11) is checked at the start of reading operation with a given reading setting. If the available memory area is not sufficient, a reading setting that allows reading operation is automatically determined in accordance with the available capacity, and the setting change check message 37 indicating the contents of this setting is displayed for the user to review. If the user consents to the change, the reading setting is automatically changed to the setting contents, and the reading processing is continued, thereby continuing and completing the desired reading operation with simple operation with user's intention being reflected.

If the user does not consent to the change to the above reading setting and clicks the cancel button, the reading setting is not changed. Thereafter, the user deletes unnecessary files in the memory (RAM 11) to increase the available capacity of the memory (RAM 11). When the user gives an instruction to start reading, the original can be read without changing the reading setting.

This embodiment has exemplified the color scanner 5 as peripheral equipment. However, the present invention is not limited to this and can be effectively applied to another peripheral equipment having a similar function, e.g., a digital camera. Obviously, the present invention can be effectively applied to a monochrome scanner as well as a color scanner. In addition, the present invention is not limited to a sheet feed type scanner and can be effectively applied to an arbitrary apparatus that can achieve a similar purpose, e.g., a flat-bed scanner.

In this embodiment, Microsoft Windows CE is used as an OS. However, the present invention is not limited to this and can be implemented by using an arbitrary OS by having a similar arrangement.

In this embodiment, the USB (Universal Serial Bus) interface is used as an interface between the hand-held PC 1 and the scanner 5. However, the present invention is not limited to this and can be implemented by an arbitrary interface by having a similar arrangement.

This embodiment can be applied to image reading systems as follows:

(1) An image reading system is comprised of a host computer including a storage unit having a finite capacity and capable of reading/writing data, and a reading apparatus capable of reading an original. The host computer is connected to the reading apparatus through an interface capable of two-way communication. An application capable of controlling the reading apparatus is installed in the host computer. The application is equipped with a reading setting selection unit capable of selecting a reading setting in the reading apparatus, and a change content notification unit for providing a notification of change contents before the setting in the reading setting selection unit is changed. When the reading apparatus starts reading, the size of the available area in the storage unit is checked, and the size of the available area is compared with the size of image data read by the reading apparatus. If the image data is larger than the available area, the change content notification unit provides a notification of change contents. The setting in the reading setting selection unit is then changed, and the reading operation is continued.

This makes it possible to easily maximize the function of the reading apparatus within a limited range and allow user to grasp the function, thus improving the operability. Even if the available capacity of the storage area is insufficient in reading processing with the reading setting set by the user, a proper reading setting is determined within this available capacity. The user is notified of this setting, and the reading setting is automatically changed to the above setting contents. The reading processing is continued in this manner. This makes it possible to continue desired reading operation with simple operation and complete it.

(2) In the image reading system (1), the application is equipped with a setting change unit capable of adjusting the size of image data read by the reading apparatus by changing the reading setting. In this system, the size of the available memory area is compared with the size of image data read by the reading apparatus. If the size of the image data is larger, the setting change unit changes the reading setting to make the size of the image data become smaller than the size of the available memory area.

This makes it possible to automatically determine a reading setting which is as similar to the reading setting desired by the user as possible and allows reading operation without user performing cumbersome operation and to easily complete reading processing.

(3) In the image reading system (1), the reading setting is made by a reading scheme selection unit capable of selecting a color multilevel mode, grayscale multilevel mode, monochrome binary mode, or the like, an original size selection unit capable of selecting an original size, or a resolution selection unit capable of selecting a reading resolution.

This allows the user to easily grasp the details of a reading setting and find a setting which is as similar to the desired reading setting as possible and allows reading operation.

(4) In the image reading system (3), the reading setting change unit changes the reading setting by changing the setting in the order of the original size, reading scheme, and resolution.

This makes it possible to quickly and effectively determine a reading setting that allows reading operation with importance attached to user's purpose.

(5) In the image reading system (1), if there is no reading setting that makes the size of the image data become smaller than the size of the available memory area, the original reading processing in the reading apparatus is stopped.

This can prevent the OS from malfunctioning.

(6) In the image reading system (1), the setting in the reading setting selection unit is changed in accordance with the notified contents from the change content notification unit.

This makes it possible to continue desired reading operation with simple operation and complete it with user's intention being reflected.

(7) In the image reading system (1), the change content notification unit includes a selection unit (selection unit 1) for continuing processing and a selection unit (selection unit 2) for inhibiting the continuation of processing. When the selection unit 1 is selected, the setting in the reading setting selection unit is changed. When the selection unit 2 is selected, the setting in the reading setting selection unit is not changed.

With this arrangement, even if the user is not satisfied with the notified change contents of the reading setting, the reading setting can be arbitrarily changed with reference to the notified reading setting without quickly changing the reading setting and continuing the reading operation.

As has been described above, according to this embodiment, in a computer having no large-capacity storage unit, the user operability can be improved, and the function of the reading apparatus designed to process a large volume of image data can be satisfactorily implemented.

The object of the present invention is realized even by supplying a storage medium storing software program codes for realizing the functions of the above-described embodiments to a system or apparatus, and causing the computer (or a CPU or an MPU) of the system or apparatus to read out and execute the program codes stored in the storage medium.

In this case, the program codes read out from the storage medium realize the functions of the above-described embodiments by themselves, and the storage medium storing the program codes constitutes the present invention. As a storage medium for supplying the program codes, a floppy disk, a hard disk, an optical disk, a magnetooptical disk, a CD-ROM, a magnetic tape, a nonvolatile memory card, a ROM, or the like can be used.

It should be noted that the above embodiments are merely examples in practicing the present invention, and the technical range of the present invention should not be interpreted limitedly by them. That is, the present invention can be practiced in various forms without departing from its technical idea and main characteristic features.

What is claimed is:

1. An image reading system comprising a reading apparatus capable of reading an original and a host computer, said host computer and said reading apparatus being connected to each other through an interface capable of two-way communication, said host computer including:

a storage unit having a finite capacity and capable of reading and writing data;

a reading setting selection unit capable of selecting a reading setting in said reading apparatus;

a setting changing unit for checking a size of an available area in said storage unit when reading is started in said reading apparatus, comparing the size of the available area with a size of image data read by said reading apparatus, and changing the reading setting in said reading setting selection unit if the size of the image data is larger;

a change content notification unit for notifying a user of change contents before said setting changing unit changes the reading setting; and a selection unit for choosing between continuing processing and not continuing the processing after a notification is provided from said change content notification unit, wherein said setting changing unit changes the reading setting in accordance with the contents from said change content notification unit if said selection unit chooses to continue the processing, and holds the reading setting without changing the setting if said selection unit does not choose to continue the processing.

2. The system according to claim 1, wherein said setting changing unit adjusts the size of image data read by said reading apparatus by changing the reading setting, compares the size of the available area with the size of the image data read by said reading apparatus, and changes the reading setting to make the size of the image data become smaller than the size of the available area if the size of the image data is larger.

3. The system according to claim 1, wherein the reading setting includes a reading scheme setting that allows selection of a color multilevel mode, a grayscale multilevel mode, or a monochrome binary mode, an original size setting that allows selection of an original size, and a resolution setting that allows selection of a reading resolution.

4. The system according to claim 3, wherein said setting changing unit changes the reading setting by changing settings in an order of the original size, reading scheme, and resolution.

5. The system according to claim 1, wherein if there is no reading setting that makes the size of the image data become smaller than the size of the available area, the original reading processing performed by said reading apparatus is stopped.

6. The system according to claim 1, wherein said change content notification unit comprises a first selection unit for choosing to continue processing and a second selection unit for choosing not to continue processing, changes the setting in said reading setting selection unit if said first selection unit chooses to continue processing, and does not change the setting in said reading setting selection unit if said second selection unit chooses not to continue processing.

7. The system according to claim 1, wherein after the reading setting is changed by said setting changing unit, reading is automatically continued.

8. A setting determination apparatus comprising:
a storage unit having a finite capacity and capable of reading and writing data;
a reading setting selection unit capable of selecting a reading setting in said reading apparatus;
a setting changing unit for checking a size of an available area in said storage unit when reading is started in said reading apparatus, comparing the size of the available area with a size of image data read by said reading apparatus, and changing the reading setting in said reading setting selection unit if the size of the image data is larger;
a change content notification unit for notifying a user of change contents before said setting changing unit changes the reading setting; and
a selection unit for choosing between continuing processing and not continuing the processing after a notification is provided from said change content notification unit,
wherein said setting changing unit changes the reading setting in accordance with the contents from said change content notification unit if said selection unit chooses to continue the processing, and holds the reading setting without changing the setting if said selection unit does not choose to continue the processing.

9. A setting determination method comprising:
(a) the step of selecting a reading setting in a reading apparatus;
(b) the step of checking a size of an available area in a storage unit when the reading apparatus starts reading, comparing the size of the available area with a size of image data read by the reading apparatus, and changing the reading setting if the size of the image data is larger;
(c) the step of notifying a user of a change content before the reading setting is changed in the setting changing step;
(d) the step of choosing between continuing processing and not continuing the processing after notification in the change content notification step; and
(e) the step of changing the reading setting in accordance with the content in the change content notification step if continuation of the processing is selected in the selection step, and holding the reading setting without changing if continuation of the processing is not selected in the selection step.

10. A computer-readable recording medium on which a program is recorded, the program causing a computer to execute
(a) the step of selecting a reading setting in a reading apparatus;
(b) the step of checking a size of an available area in a storage unit when the reading apparatus starts reading, comparing the size of the available area with a size of image data read by the reading apparatus, and changing the reading setting if the size of the image data is larger;
(c) the step of notifying a user of a change content before the reading setting is changed in the setting changing step;
(d) the step of choosing between continuing processing and not continuing the processing after notification in the change content notification step; and
(e) the step of changing the reading setting in accordance with the content in the change content notification step if continuation of the processing is selected in the selection step, and holding the reading setting without changing if continuation of the processing is not selected in the selection step.

11. The medium according to claim 10, wherein the program causes the computer to further execute the step of automatically continuing reading operation after the reading setting is changed in the setting changing step.

12. A program for causing a computer to execute
(a) the step of selecting a reading setting in a reading apparatus;
(b) the step of checking a size of an available area in a storage unit when the reading apparatus starts reading, comparing the size of the available area with a size of image data read by the reading apparatus, and changing the reading setting if the size of the image data is larger;
(c) the step of notifying a user of a change content before the reading setting is changed in the setting changing step;
(d) the step of choosing between continuing processing and not continuing the processing after notification in the change content notification step; and
(e) the step of changing the reading setting in accordance with the content in the change content notification step if continuation of the processing is selected in the selection step, and holding the reading setting without changing if continuation of the processing is not selected in the selection step.

13. The program according to claim 12, wherein the program causes the computer to further execute the step of automatically continuing reading operation after the reading setting is changed in the setting changing step.

14. An image reading apparatus which can be used by being connected to an external controller through an interface capable of two-way communication, wherein said external controller including:
- a storage unit having a finite capacity and capable of reading and writing data;
- a reading setting selection unit capable of selecting a reading setting in said reading apparatus;
- a setting changing unit for changing the reading setting in said reading setting selection unit; and
- a change content notification unit for providing a notification of a content of a change made by said setting changing unit,
- wherein when reading is started, a size of an available area in said storage unit is checked, the size of the available area is compared with a size of image data to be read, and if the size of the image data is larger, a change content is notified by said change content notification unit, and said setting changing unit changes the reading setting and continues reading operation.

15. The apparatus according to claim 14, wherein the size of the available area is compared with the size of the image data read by the reading apparatus, and if the size of the image data is larger, said setting changing unit changes the reading setting to make the size of the image data become smaller than the size of the available area.

16. The apparatus according to claim 14, wherein the reading setting includes a reading scheme setting that allows selection of a color multilevel mode, a grayscale multilevel mode, or a monochrome binary mode, an original size setting that allows selection of an original size, and a resolution setting that allows selection of a reading resolution.

17. The apparatus according to claim 16, wherein said setting changing unit changes the reading setting by changing settings in an order of the original size, reading scheme, and resolution.

18. The apparatus according to claim 14, wherein if there is no reading setting that makes the size of the image data become smaller than the size of the available area, the original reading processing is stopped.

19. The apparatus according to claim 14, wherein said change content notification unit comprises a first selection unit for choosing to continue processing and a second selection unit for choosing not to continue processing, changes the setting in said reading setting selection unit if said first selection unit chooses to continue processing, and does not change the setting in said reading setting selection unit if said second selection unit chooses not to continue processing.

20. An image reading method comprising:
- the check step of checking a size of an available area in a storage unit having a finite capacity when an image reading apparatus starts reading;
- the comparison step of comparing the size of the available area with a size of image data read by said image reading apparatus;
- the changing step of changing a reading setting in the image reading apparatus if the size of the image data is larger;
- the notification step of providing a notification of a change content in the changing step; and
- the reading continuation step of continuing reading operation in the image reading apparatus after the notification is provided.

* * * * *

UNITED STATES PATENT AND TRADEMARK OFFICE
CERTIFICATE OF CORRECTION

| | |
|---|---|
| PATENT NO. | : 6,850,653 B2 |
| APPLICATION NO. | : 09/924143 |
| DATED | : February 1, 2005 |
| INVENTOR(S) | : Koichi Abe |

It is certified that error appears in the above-identified patent and that said Letters Patent is hereby corrected as shown below:

On the cover page, under

[30] Foreign Application Priority Data add:

Feb. 13, 2001 [JP]   2001-035846

Signed and Sealed this

Twenty-ninth Day of August, 2006

JON W. DUDAS
*Director of the United States Patent and Trademark Office*